United States Patent
Shingai

(10) Patent No.: US 8,224,227 B2
(45) Date of Patent: Jul. 17, 2012

(54) DOCUMENT FEEDING DEVICE

(75) Inventor: Hiroyuki Shingai, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 590 days.

(21) Appl. No.: 12/394,427

(22) Filed: Feb. 27, 2009

(65) Prior Publication Data

US 2009/0220290 A1    Sep. 3, 2009

(30) Foreign Application Priority Data

Feb. 29, 2008  (JP) ................................. 2008-050027

(51) Int. Cl.
*G03G 15/00* (2006.01)
*B65H 31/08* (2006.01)

(52) U.S. Cl. ......... 399/367; 399/374; 399/405; 271/212

(58) Field of Classification Search .................. 399/367, 399/374, 405; 271/65, 88, 212, 213, 209, 271/292

See application file for complete search history.

(56) References Cited

U.S. PATENT DOCUMENTS

| | | | | |
|---|---|---|---|---|
| 6,042,103 A * | 3/2000 | Yraceburu et al. | ........... | 271/118 |
| 6,095,517 A * | 8/2000 | Dinatale | ........... | 271/212 |
| 6,350,072 B1 * | 2/2002 | Nunes et al. | ........... | 400/188 |
| 2006/0062615 A1 | 3/2006 | Horio | | |

FOREIGN PATENT DOCUMENTS

| | | |
|---|---|---|
| EP | 0 990 956 A2 | 4/2000 |
| JP | 07-008356 | 2/1995 |
| JP | 11-314856 | 11/1999 |
| JP | 2001-058739 | 3/2001 |
| JP | 2001-106408 | 4/2001 |
| JP | 2006-232460 | 9/2006 |

OTHER PUBLICATIONS

Japanese Office Action received for counterpart JP Application No. 2008-050027, mailed Jan. 26, 2010.
European Search Report for corresponding European Patent Application No. 09002765.7 dated Jan. 5, 2012.

* cited by examiner

*Primary Examiner* — Judy Nguyen
*Assistant Examiner* — Justin Olamit
(74) *Attorney, Agent, or Firm* — Banner & Witcoff, Ltd.

(57) ABSTRACT

A document feeding device comprises a document input tray, a document output tray, a feeding mechanism provided for a feeding path connecting the document input tray and the document output tray via a scanning position to feed each document from the document input tray to the scanning position and to the document output tray, a turnover mechanism provided for a turnover path connected to the feeding path to return the document after passing through the scanning position to the upstream side of the scanning position while interchanging the front end and rear end of the document, and an ejection mechanism configured so that its document ejection mode can be switched between a first ejection mode for successively ejecting each document while stacking it on documents already ejected to the document output tray and a second ejection mode for successively ejecting each document while sliding it under the already ejected documents.

5 Claims, 10 Drawing Sheets

DOCUMENT FEEDING DEVICE

CROSS-REFERENCE TO RELATED APPLICATION

This application claims priority under 35 U.S.C. §119 from Japanese Patent Application No. 2008-050027 filed on Feb. 29, 2008. The entire subject matter of the application is incorporated herein by reference.

BACKGROUND

1. Technical Field

Aspects of the present invention relate to a document feeding device for feeding a document from a document input tray to a document output tray via a scanning position of a document scanner.

2. Prior Art

In a document feeding device for feeding a document from a document input tray to a document output tray via a scanning position of a document scanner, the order of arrangement of documents ejected to (stacked on) the document output tray generally varies depending on whether the scanning mode of the document scanner is single-side scan (scanning one side of each document) or double-side scan (scanning both sides of each document by turning over each document with a turnover mechanism). Some of conventional document feeding devices are designed to eject the scanned documents to the document output tray after rearranging the order of the documents by carrying out idle feeding (turning over each document again with the turnover mechanism). However, the idle feeding results in an increase in the time necessary for ejecting each document (i.e. for completing the scanning of each document).

In order to avoid the problem, an automatic document feeding device disclosed in Japanese Patent Provisional Publication No. HEI 11-314856 (FIG. 1), for example, is equipped with two separate document output trays (single-side document output tray, double-side document output tray). The automatic document feeding device ejects the scanned documents to the single-side document output tray in cases of single-side scan, while ejecting the scanned documents to the double-side document output tray in cases of double-side scan. Such an automatic document feeding device is capable of shortening the time necessary for completing the scanning of each document since the aforementioned idle feeding is unnecessary.

SUMMARY OF THE INVENTION

However, with the above automatic document feeding device equipped with two document output trays, the user has to check to which document output tray the scanned documents are being ejected when the user takes out the documents, which is troublesome to the user.

In consideration of the above problems, the aspects of the invention are advantageous in that a document feeding device, capable of ejecting the documents to a common document output tray in the normal arrangement order irrespective of whether the scanning mode is single-side scan or double-side scan without the need of executing the idle feeding, can be provided.

In accordance with aspects of the present invention, there is provided a document feeding device for feeding documents, comprising a document input tray on which documents to be fed are placed, a document output tray to which the documents are ejected, a feeding mechanism which is provided for a feeding path connecting the document input tray and the document output tray via a scanning position and feeds each document from the document input tray to the scanning position and from the scanning position to the document output tray, a turnover mechanism which is provided for a turnover path connected to the feeding path and returns the document after passing through the scanning position to a position on the upstream side of the scanning position while interchanging the front end and the rear end of the document in a feeding direction, and an ejection mechanism which is configured so that its document ejection mode can be switched between a first ejection mode for successively ejecting each document while stacking it on documents already ejected to the document output tray and a second ejection mode for successively ejecting each document while sliding it under the documents already ejected to the document output tray.

In the document feeding device configured as above, the document ejection mode can be switched between the first ejection mode for successively ejecting each document while stacking it on the documents already ejected to the document output tray and the second ejection mode for successively ejecting each document while sliding it under the documents already ejected to the document output tray.

By the switching of the document ejection mode, the documents can be ejected to a common document output tray in the normal arrangement order irrespective of whether the scanning mode is single-side scan or double-side scan, without the need of executing the idle feeding. Consequently, the time for the idle feeding of each document becomes unnecessary and the total time necessary for completing the scanning of the documents can be reduced considerably. Further, since the documents can be ejected to one (common) document output tray in the normal arrangement order (irrespective of whether the scanning mode is single-side scan or double-side scan), a great degree of user convenience can be realized.

Other objects, features and advantages of the aspects of the present invention will become more apparent from the consideration of the following detailed description taken in conjunction with the accompanying drawings.

BRIEF DESCRIPTION OF THE ACCOMPANYING DRAWINGS

DETAILED DESCRIPTION OF THE EMBODIMENT

Figure 1:
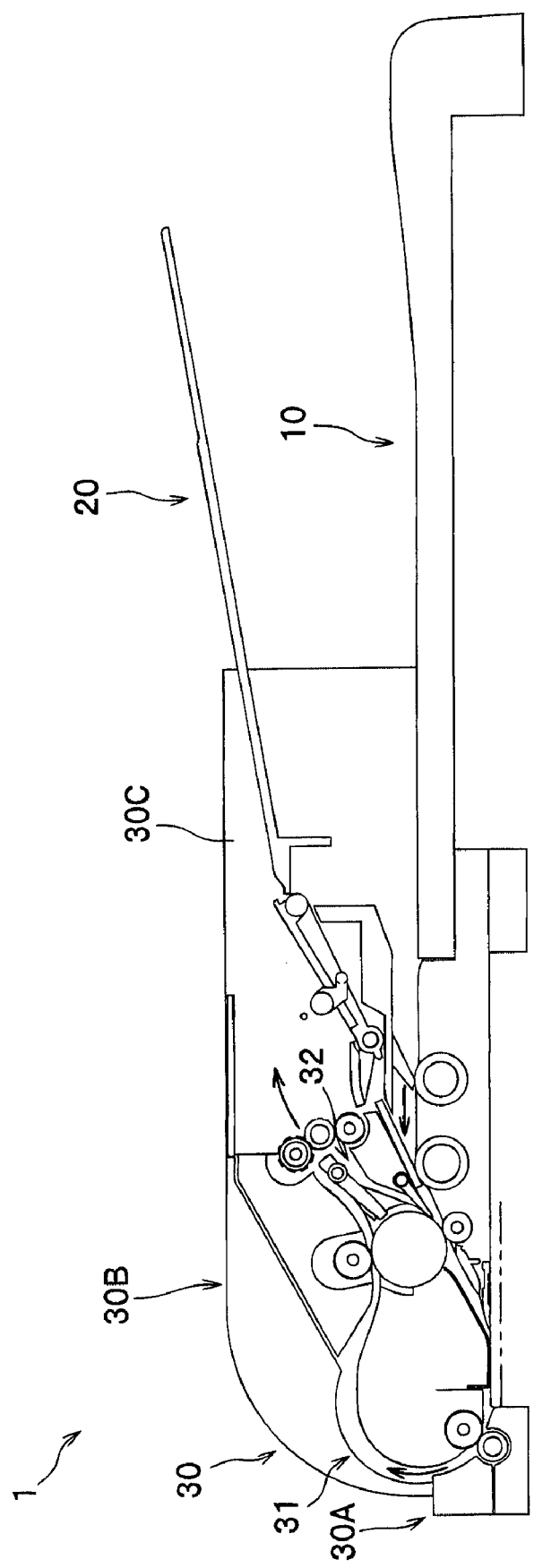
FIG. 1 is a cross-sectional view showing the overall configuration of a document feeding device in accordance with an embodiment of the aspects of the present invention.

Referring now to the drawings, a description will be given in detail of a preferred embodiment in accordance with the aspects of the present invention.

<Overall Configuration of Document Feeding Device>

Figure 2:
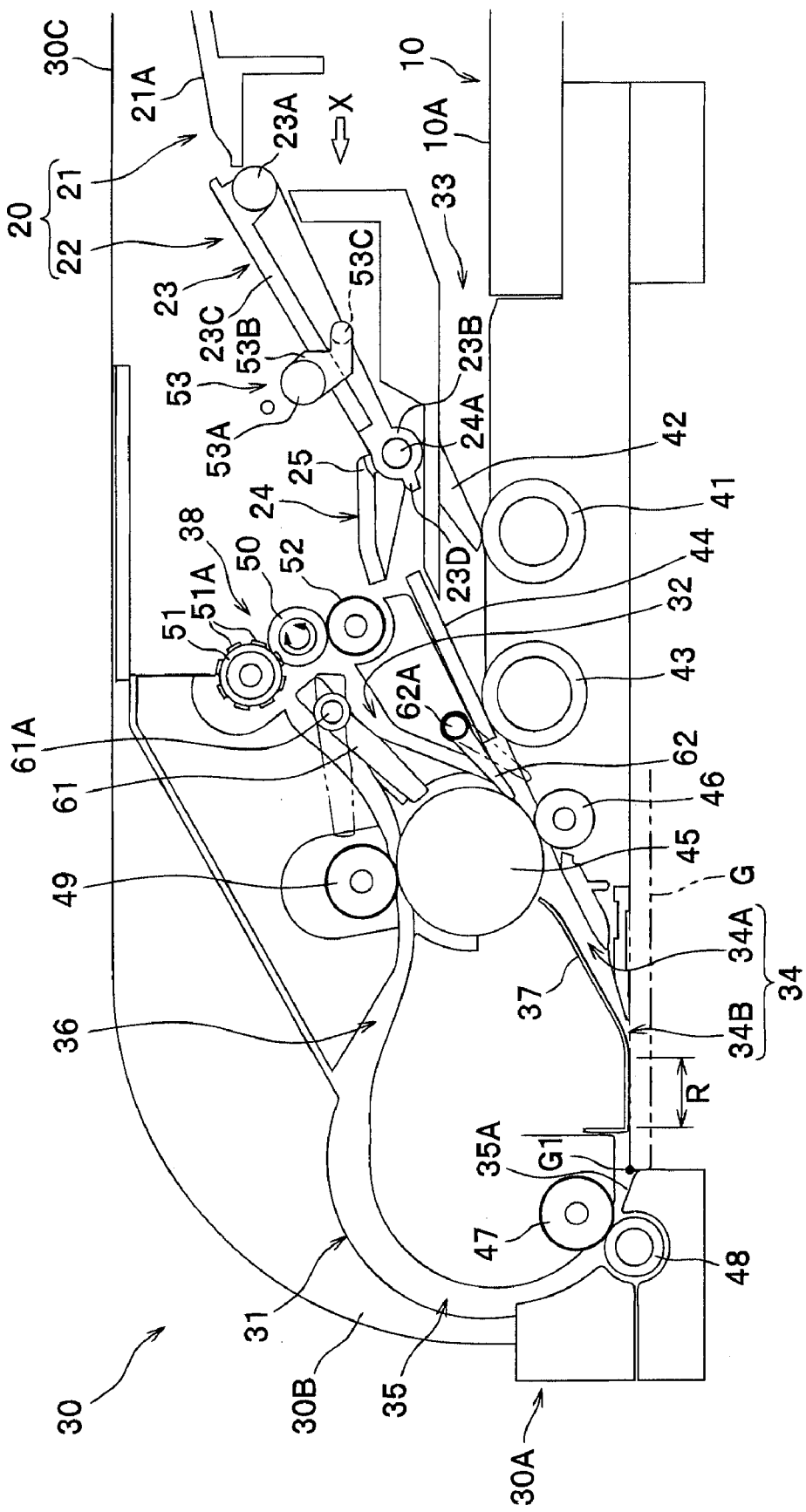
FIG. 2 is a cross-sectional view showing the configuration of a document feeding unit of the document feeding device.

FIG. 1 is a cross-sectional view showing the overall configuration of a document feeding device in accordance with an embodiment of the aspects of the present invention. FIG. 2 is a cross-sectional view showing the configuration of a document feeding unit of the document feeding device.

As shown in FIG. 1, the document feeding device 1 of this embodiment mainly includes a document input tray 10, a document output tray 20 and a document feeding unit 30.

The document input tray 10, as a part on which documents to be scanned (i.e. documents to be fed) are placed, is situated in a lower right part of the document feeding device 1 in FIG. 1.

The document output tray 20, as a part on which the documents after being scanned (i.e. after being ejected from the document feeding unit 30) are stacked, is situated above the document input tray 10. The detailed configuration of the document output tray 20 will be described later.

The document feeding unit 30, as a unit for feeding the document from the document input tray 10 to the document output tray 20, is situated to the left of the document input tray 10 and the document output tray 20 in FIG. 1. An outer frame of the document feeding unit 30 includes a body frame 30A and a cover 30B which is rotatable with respect to the body frame 30A around an axis in a lower left part in FIG. 1. A feeding path 31 and a turnover path 32 for feeding the document are formed mainly by the body frame 30A and the cover 30B. In the document feeding unit 30, the feeding path 31 is equipped with a feeding mechanism (explained later) and a part of an ejection mechanism (explained later), while the turnover path 32 is equipped with a turnover mechanism (explained later).

In the following explanation, the traveling direction of the document being fed from the document input tray 10 to the document output tray 20 through the feeding path 31 (indicated by arrows in FIG. 1) will be referred to as a "feeding direction". Expressions "upstream side" and "downstream side" in the following explanation mean "upstream side in the feeding direction" and "downstream side in the feeding direction", respectively.

<Configuration of Feeding Path and Turnover Path>

As shown in FIG. 2, the feeding path 31 (formed substantially in a U-shape) is a path connecting the document input tray 10 and the document output tray 20 via a scanning position R. The feeding path 31 is made up of an intake path 33, a lower feeding path 34, a curved path 35 and an upper feeding path 36.

The intake path 33 continuously extends from a loading surface 10A of the document input tray 10 toward the downstream side substantially in a horizontal direction. In the intake path 33, a guide surface is formed by the body frame 30A.

The lower feeding path 34 includes a sloped part 34A extending from the downstream end of the intake path 33 toward the lower left in FIG. 2 and a horizontal part 34B extending downstream substantially in a horizontal direction from the downstream end of the sloped part 34A. In the lower feeding path 34, a lower guide surface of the sloped part 34A is formed by the body frame 30A, while an upper guide surface of the sloped part 34A and the horizontal part 34B is formed by a document guide 37. The bottom of the horizontal part 34B is open (as the scanning position R) so as to expose the document for the scanning.

The document guide 37 mainly includes a sloped part and a horizontal part corresponding to the sloped part 34A and the horizontal part 34B of the lower feeding path 34. The horizontal part of the document guide 37 holds down the document being exposed at the scanning position R. Incidentally, in cases where the document feeding device 1 is used with (installed in) a copier, MFP (Multi-Function Peripheral), etc., platen glass G of a document scanner (unshown) of a well-known type is provided under the horizontal part of the document guide 37. A scan target surface of the document, fed to the scanning position R through the horizontal part 34B while being sandwiched between the document guide 37 and the platen glass G, is scanned by an unshown document scanning unit (e.g. image sensor) placed beneath the platen glass G.

The curved path 35, extending upward like an arc from the downstream end of the lower feeding path 34 (horizontal part 34B), changes the feeding direction by approximately 180 degrees (leftward to rightward in FIG. 2). In the curved path 35, a guide surface is formed by the body frame 30A and the cover 30B. Although not illustrated, a part of the curved path 35 can be exposed by rotating and opening the cover 30B, through which a document jammed in the feeding path 31 can be removed.

Incidentally, a guide surface 35A, sloping from a position under the upper edge of the downstream end of the platen glass G toward a nipping position of a second feeding roller 47 and a pinch roller 48 (explained later), is formed at the bottom of the curved path 35 at its upstream end, by which the document being fed on the platen glass G is smoothly fed to the curved path 35 without getting snagged.

The upper feeding path 36 extends from the downstream end of the curved path 35 toward the document output tray 20. In the upper feeding path 36, an upper guide surface is formed by the body frame 30A, while a lower guide surface is formed by the body frame 30A and a first guide member 61 which will be explained later. The downstream end of the upper feeding path 36 serves as a document outlet 38.

The turnover path 32 extends from the document outlet 38 toward the lower left in FIG. 2 to connect to the upstream end of the lower feeding path 34 (sloped part 34A). In the turnover path 32, guide surfaces are formed by the body frame 30A, the first guide member 61 (explained later) and a second guide member 62 (explained later).

<Configuration of Feeding Mechanism>

The feeding path 31 is equipped with the feeding mechanism, which feeds the document from the document input tray 10 to the scanning position R, and to the document output tray 20. In this embodiment, the feeding mechanism is mainly composed of an intake roller 41, an intake pad 42, a separation roller 43, a separation pad 44, a first feeding roller 45, the second feeding roller 47, a switchback roller 50 and pinch rollers 46, 48, 49 and 51.

The intake roller 41, for pulling the documents placed on the document input tray 10 toward the separation roller 43, is situated to expose its top from the bottom of the intake path 33 at a position near the midpoint of the intake path 33. The intake roller 41 is driven and rotated by driving force transmitted from an unshown motor.

The intake pad 42, for pressing the documents against the intake roller 41 to let the intake roller 41 pull the documents steadily, is situated to face the intake roller 41 from above. The intake pad 42, capable of pivoting up and down, is constantly biased toward the intake roller 41.

The separation roller 43, for sending out the documents one by one, is situated to expose its top from the bottom of the intake path 33 at the downstream end of the intake path 33. The separation roller 43 is driven and rotated by driving force transmitted from the unshown motor.

The separation pad 44, for pressing the documents against the separation roller 43 to let the separation roller 43 separate and send out a document with reliability, is situated to face the separation roller 43 from above. The separation pad 44, capable of pivoting up and down, is constantly biased toward the separation roller 43.

The first feeding roller 45, for feeding the document inside the feeding path 31, is situated to expose its bottom from the top of the lower feeding path 34 (sloped part 34A) at a position near the midpoint of the sloped part 34A while exposing its top from the bottom of the upper feeding path 36 at a position near the midpoint of the upper feeding path 36. The first feeding roller 45 is driven and rotated by driving force transmitted from the unshown motor.

The pinch roller 46 is situated at a position near the midpoint of the sloped part 34A, with its top (exposed from the bottom of the sloped part 34A) contacting the first feeding roller 45.

The second feeding roller 47, for feeding the document from the scanning position R toward the document output tray 20, is situated to expose its bottom from the top of the curved path 35 at a position near the upstream end of the curved path 35. The second feeding roller 47 is driven and rotated by driving force transmitted from the unshown motor.

The pinch roller 48 is situated at a position near the upstream end of the curved path 35, with its top (exposed from the bottom of the curved path 35) contacting the second feeding roller 47.

The pinch roller 49 is situated at a position near the midpoint of the upper feeding path 36, with its bottom (exposed from the top of the upper feeding path 36) contacting the first feeding roller 45.

The switchback roller 50, for ejecting the document to the document output tray 20, is situated at the document outlet 38. The switchback roller 50 is driven and rotated by driving force transmitted from the unshown motor. Incidentally, the switchback roller 50 forms a part of the turnover mechanism (explained later) and the ejection mechanism (explained later).

The pinch roller 51 is situated at the document outlet 38 to contact the switchback roller 50 from above. At both ends of the pinch roller 51 in its axial direction, a plurality of projections 51A, for pushing out the document (to be ejected) by making contact with the rear end of the document in the feeding direction, are formed around the periphery of the pinch roller 51.

Since the pinch rollers 46, 48, 49 and 51 are biased by unshown biasing members toward the corresponding rollers 45, 47, 45 and 50, respectively, the document can be pressed against the rollers 45, 47 and 50, by which the document can be fed with reliability.

<Configuration of Turnover Mechanism>

The turnover path 32 is equipped with the turnover mechanism. The turnover mechanism returns the document from the document outlet 38 to a position on the upstream side of the scanning position R (specifically, to a position on the upstream side of the lower feeding path 34 (sloped part 34A) while interchanging the front end and the rear end of the document in the feeding direction (and turning over the document). In this embodiment, the turnover mechanism is mainly composed of the first guide member 61, the second guide member 62, the switchback roller 50 and a pinch roller 52.

The first guide member 61, which is situated at a position near the document outlet 38 and on the upstream side of the switchback roller 50, is capable of pivoting up and down around a pivot shaft 61A. When the document turnover is not carried out, the first guide member 61 stays downward (as indicated with solid lines in FIG. 2) and thereby guides the document toward a nipping position of the switchback roller 50 and the pinch roller 51. In this state, the first guide member 61 forms a part of the lower guide surface of the upper feeding path 36.

On the other hand, when the document turnover is carried out, the first guide member 61 first pivots upward (as indicated with chain lines in FIG. 2) to change the course of the upper feeding path 36, and thereby guides the document toward a nipping position of the switchback roller 50 and the pinch roller 52. After the whole document has entered the turnover path 32, the first guide member 61 pivots downward (as indicated with solid lines in FIG. 2) to form a part of the guide surface of the turnover path 32.

The second guide member 62, which is situated at the intersection of the turnover path 32 and the feeding path 31 (lower feeding path 34), is capable of pivoting up and down around a pivot shaft 62A. When the document turnover is carried out, the second guide member 62 pivots downward (as indicated with chain lines in FIG. 2) and thereby connects the turnover path 32 to the lower feeding path 34. In this state, the second guide member 62 forms a part of the guide surface of the turnover path 32. When the document turnover is not carried out, the second guide member 62 stays upward (as indicated with solid lines in FIG. 2) to connect the intake path 33 to the lower feeding path 34.

The switchback roller 50 is controlled by a well-known control method so that its rotational direction can be changed. When the document turnover is carried out, the switchback roller 50 is driven and rotated counterclockwise in FIG. 2 so as to temporarily feed the document (sandwiched between the switchback roller 50 and the pinch roller 52) toward the outside. Before the document is totally ejected, the rotation of the switchback roller 50 is stopped according to the well-known control method. Then, the switchback roller 50 is driven and rotated clockwise in FIG. 2 so as to pull in the document sandwiched between the switchback roller 50 and the pinch roller 52. In this state (with the first guide member 61 staying downward as indicated with solid lines in FIG. 2), the document pulled in is guided to the turnover path 32 along the lower surface of the first guide member 61.

The pinch roller 52 is situated in a lower part of the document outlet 38 to contact the switchback roller 50 from below. The pinch roller 52, which is also biased toward the switchback roller 50 similarly to the pinch roller 51 on the other side, is capable of pressing the document against the switchback roller 50, by which the document can be fed steadily.

<Operation of Document Feeding Unit>

Figure 3:
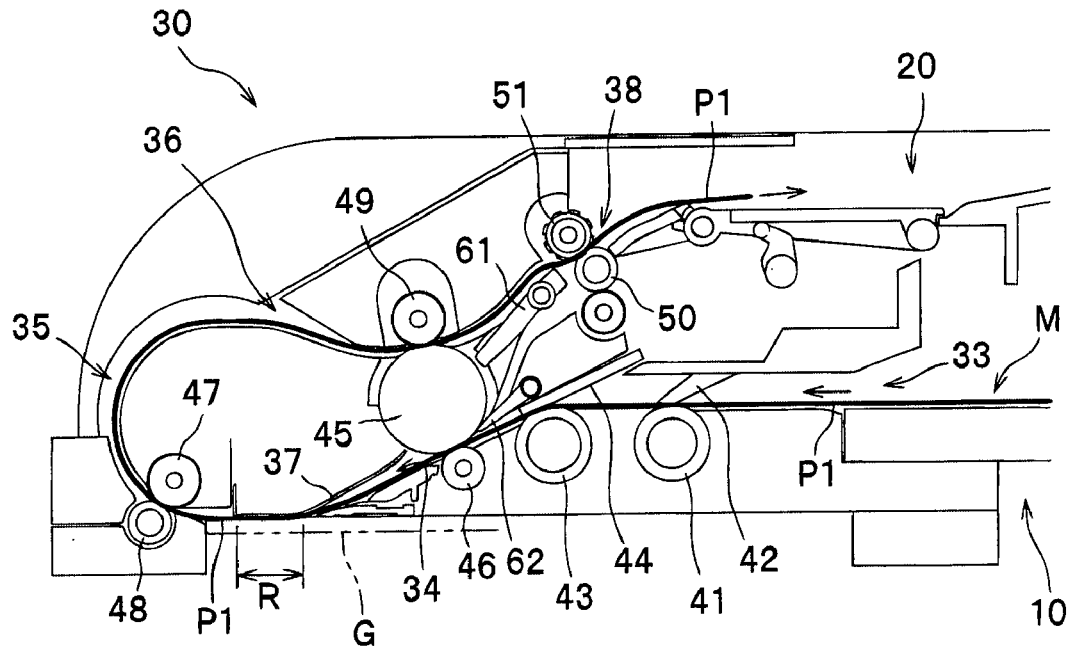
FIG. 3 is a cross-sectional view showing the operation of the document feeding unit for the single-side scan.
Figure 4:
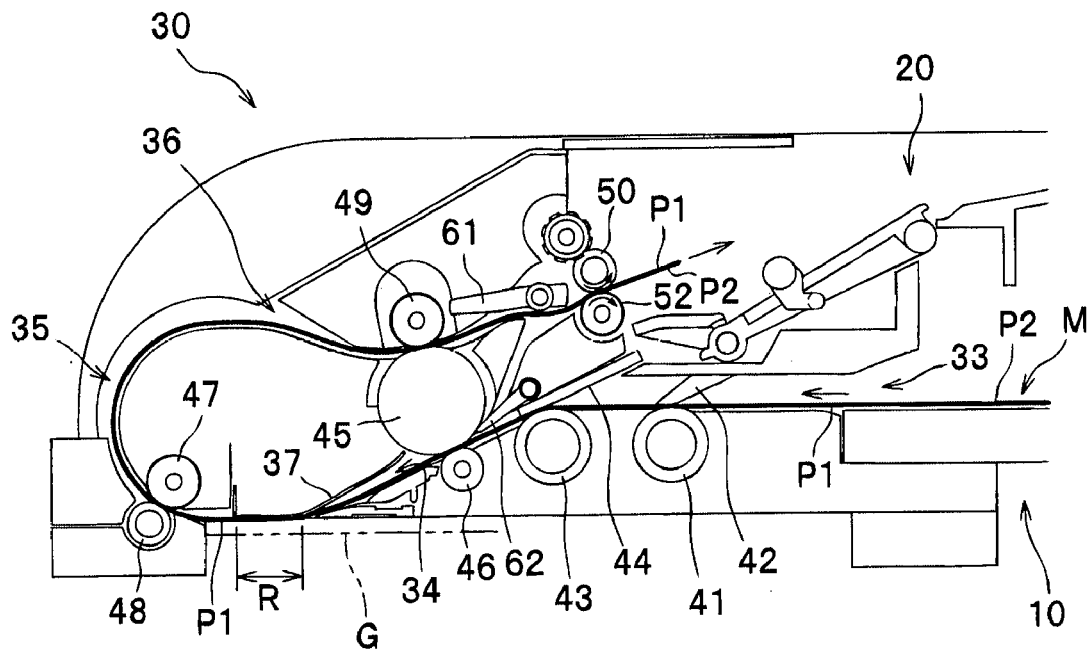
FIG. 4 is a cross-sectional view showing the operation of the document feeding unit for the double-side scan.
Figure 5:
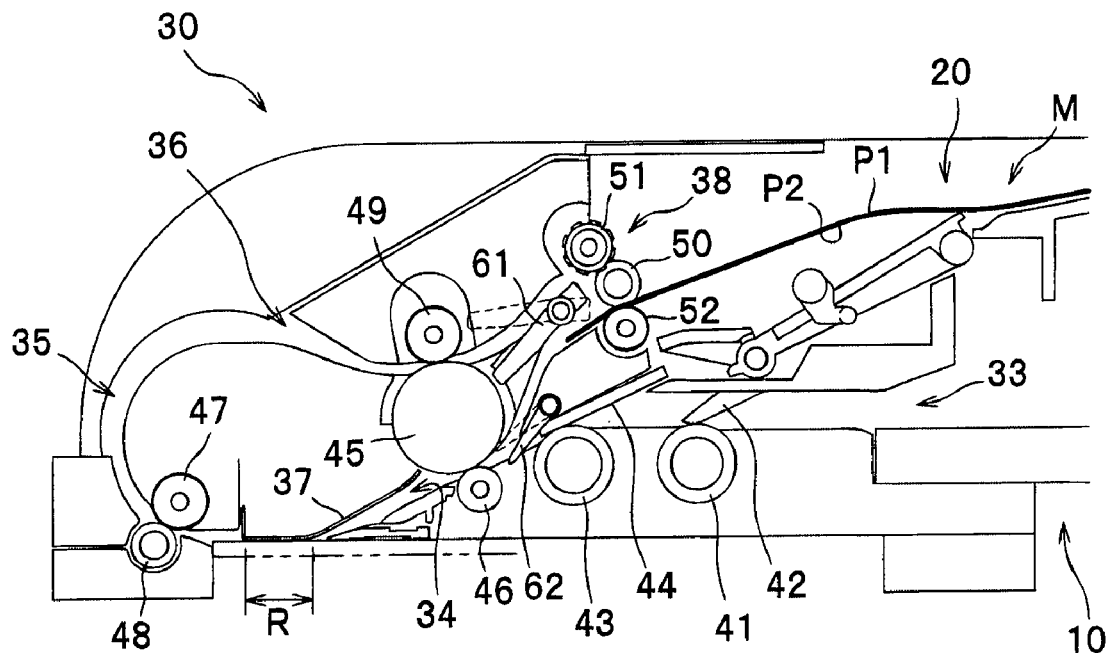
FIG. 5 is a cross-sectional view showing the operation of the document feeding unit for the double-side scan.
Figure 6:
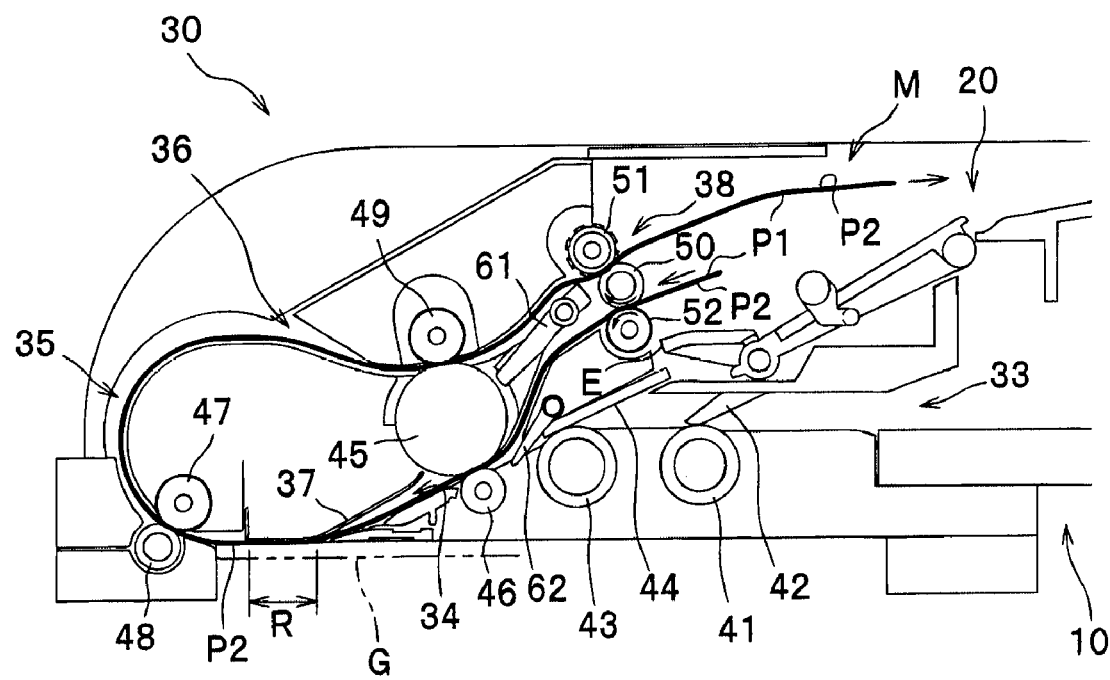
FIG. 6 is a cross-sectional view showing the operation of the document feeding unit for the double-side scan.

Here, the operation of the document feeding unit 30 configured as above will be described. FIG. 3 is a cross-sectional view showing the operation of the document feeding unit 30 for the single-side scan. FIGS. 4-6 are cross-sectional views showing the operation of the document feeding unit 30 for the double-side scan.

The document feeding device 1 is equipped with an unshown operation panel, etc., through which the user can specify the single-side scan or the double-side scan. Incidentally, the operation panel may also be provided on an image scanning device (scanner, MFP, copier, etc.) in which the document feeding device 1 is installed.

(Single-Side Scan)

When the single-side scan is selected by the user through the operation panel, the first guide member 61 stays at the lower position and the second guide member 62 stays at the upper position as shown in FIG. 3. A document M placed on the document input tray 10 with its scan target surface P1 facing downward is pulled toward the separation roller 43 by the intake roller 41 and the intake pad 42 and then fed to the lower feeding path 34 by the separation roller 43 and the separation pad 44.

The document M in the lower feeding path 34 is fed by the first feeding roller 45 and the pinch roller 46 to the scanning position R with its scan target surface PI facing downward. At the scanning position R, the scan target surface P1 of the document M is scanned by a well-known document scanner. Thereafter, the document M is fed through the curved path 35 and the upper feeding path 36 by the rollers 47, 48, 45 and 49 and then ejected through the document outlet 38 by the switchback roller 50 and the pinch roller 51.

Since the document M is ejected with its scan target surface P1 facing upward in this case (single-side scan), the scan target surfaces P1 of already ejected documents (if any) are also facing upward. Therefore, the documents ejected can be arranged in the normal order by successively ejecting each document M while sliding it under the already ejected documents. The ejection mechanism for sliding each document M under the already ejected documents will be described later.

(Double-Side Scan)

When the double-side scan is selected by the user through the operation panel, the first guide member 61 and the second guide member 62 first stay at the upper positions as shown in FIG. 4. A document M placed on the document input tray 10 with its front scan target surface P1 facing downward and its back scan target surface P2 facing upward is fed to the lower feeding path 34 by the rollers 41 and 43 and the pads 42 and 44.

The document M in the lower feeding path 34 is fed by the first feeding roller 45 and the pinch roller 46 to the scanning position R with its front scan target surface P1 facing downward, at which the front scan target surface P1 of the document M is scanned. Thereafter, the document M is fed through the curved path 35 and the upper feeding path 36 by the rollers 47, 48, 45 and 49, guided under the first guide member 61, and fed toward the outside by the switchback roller 50 and the pinch roller 52.

By stopping the switchback roller 50 (by the well-known control method) before the document M is totally ejected by the switchback roller 50 and the pinch roller 52, the document M barely remains inside with its rear end sandwiched between the switchback roller 50 and the pinch roller 52 as shown in FIG. 5. Then, by pivoting both the first guide member 61 and the second guide member 62 downward, the turnover path 32 is formed and connected to the lower feeding path 34. In this state, the front scan target surface P1 and the back scan target surface P2 of the document M are facing upward and downward, respectively.

By reversing the rotational direction of the switchback roller 50 as shown in FIG. 6, the document M is pulled into the turnover path 32 by the switchback roller 50 and the pinch roller 52 and is fed to the upstream part of the lower feeding path 34 (on the upstream side of the scanning position R). Then, the document M is fed by the first feeding roller 45 and the pinch roller 46 to the scanning position R with its back scan target surface P2 facing downward, at which the back scan target surface P2 of the document M is scanned. Thereafter, the document M is fed through the curved path 35 and the upper feeding path 36 by the rollers 47, 48, 45 and 49 and then ejected through the document outlet 38 by the switchback roller 50 and the pinch roller 51.

Since the document M is ejected with its back scan target surface P2 facing upward in this case (double-side scan), the back scan target surfaces P2 of already ejected documents (if any) are also facing upward. Therefore, the documents ejected can be arranged in the normal order by successively ejecting each document M while stacking it on the already ejected documents. In cases where the upstream end E of the document output tray 20 is situated above the nipping position of the switchback roller 50 and the pinch roller 51 as shown in FIG. 6, the document M can be stacked on the already ejected documents by just ejecting the document M, by which the documents ejected can be arranged in the normal order.

<Configuration of Ejection Mechanism>

Figure 7:
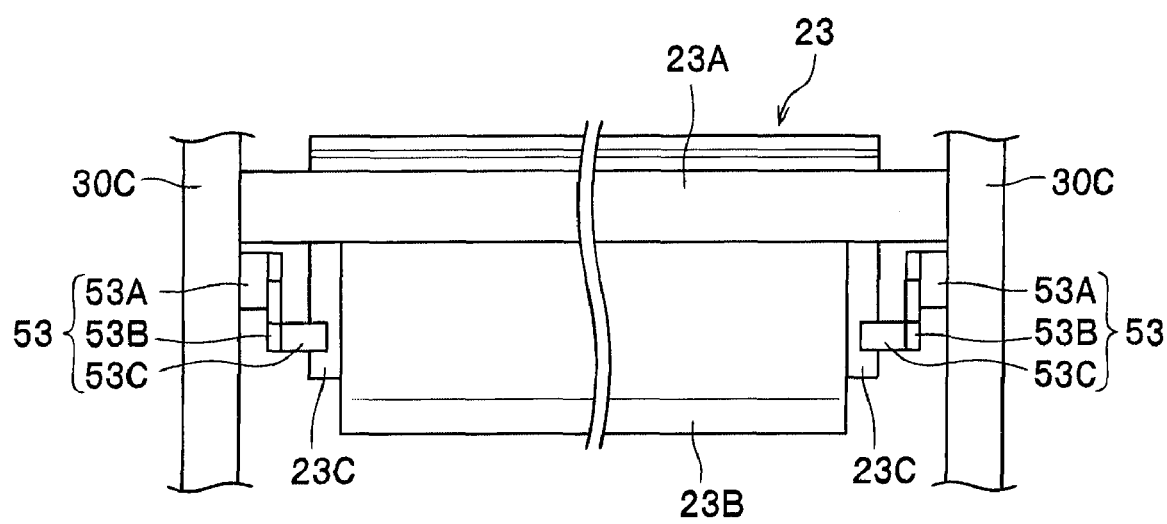
FIG. 7 is a schematic diagram showing a flap part and cams of an ejection mechanism of the document feeding device viewed in the direction of arrow X in FIG. 2.

Next, the configuration of the ejection mechanism capable of switching the document ejection mode (a feature of this embodiment) will be described. FIG. 7 is a schematic diagram showing a flap part and cams of the ejection mechanism viewed in the direction of arrow X in FIG. 2.

In the following explanation, the direction orthogonal to the sheet of FIG. 2, that is, the width direction of the document (orthogonal to the feeding direction) will be referred to simply as a "width direction".

As shown in FIG. 2, the ejection mechanism is mainly composed of the document output tray 20, the switchback roller 50 and the pinch roller 51 (as an example of a pair of ejection rollers), and cams 53 (as an example of a switching drive mechanism).

The document output tray 20 is mainly composed of a tray part 21 and a flap part 22 situated on the upstream side of the tray part 21.

The tray part 21 is situated over the loading surface 10A of the document input tray 10, with its both edges regarding the width direction fixed to side panels 30C. The upper surface of the tray part 21 serves as a stacking surface 21A on which the documents ejected are stacked up. The side panels 30C, which are placed on both sides of the tray part 21 in the width direction integrally with the body frame 30A, are panel-like members forming the outer frame (housing) of the document feeding device 1 together with the body frame 30A and the cover 30B (see FIG. 1, in which only one side panel 30C is shown).

The flap part 22 includes a first flap 23 and a second flap 24.

The first flap 23 is attached to the tray part 21 to be capable of pivoting up and down around a pivot shaft 23A at its downstream end. The first flap 23 has a shaft bearing part 23B at its upstream end. In upper parts of side faces of the first flap 23 on both sides in the width direction, contacting parts 23C (with which the cams 53 (push-up parts 53C) which will be explained later make contact, respectively) are formed to protrude outward in the width direction (see FIG. 7).

The second flap 24 is situated on the upstream side of the first flap 23. The second flap 24 is attached to the first flap 23 to be capable of pivoting around a pivot shaft 24A which is borne by the shaft bearing part 23B of the first flap 23. The second flap 24, having a bent part 25 bending downward on the downstream side, is shaped like an "L" overall. Incidentally, downward pivoting of the second flap 24 is restricted within a prescribed range by a stopper 23D (formed at the downstream end of the first flap 23) which makes contact with the lower surface of the second flap 24.

For ejecting the document, the switchback roller 50 is driven and rotated clockwise in FIG. 2, by which the document is fed between the switchback roller 50 and the pinch roller 51 and ejected to the document output tray 20.

The cams 53 are provided on both sides of the first flap 23 in the width direction as shown in FIG. 7. Each cam 53 is integrally formed by a shaft part 53A, a link part 53B and a push-up part 53C. The shaft part 53A, which is attached to the side panel 30C to be rotatable, is driven and rotated by driving force transmitted from the unshown motor. The link part 53B, for linking the shaft part 53A with the push-up part 53C, is substantially in parallel with the side panel 30C. The push-up part 53C is a substantially cylindrical part which extends inward in the width direction from the distal end of the link part 53B.

<Action and Effect>

The action and effect of the document feeding device 1 configured as above will be described below. FIGS. 8-11 are partial cross-sectional views for explaining the operation of the cams 53 and the document output tray 20 of the document feeding device 1. FIG. 12A is a cross-sectional view showing a state of the document feeding device 1 in a second ejection mode. FIG. 12B is a cross-sectional view showing a state of the document feeding device 1 in a first ejection mode.

Figure 8:
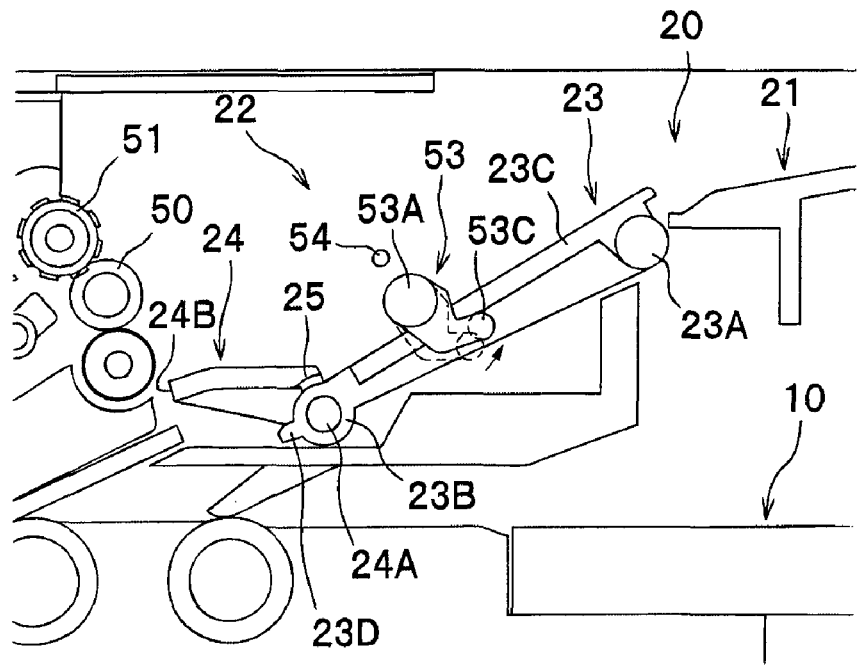
FIG. 8 is a partial cross-sectional view for explaining the operation of the cams and a document output tray of the document feeding device.
Figure 9:
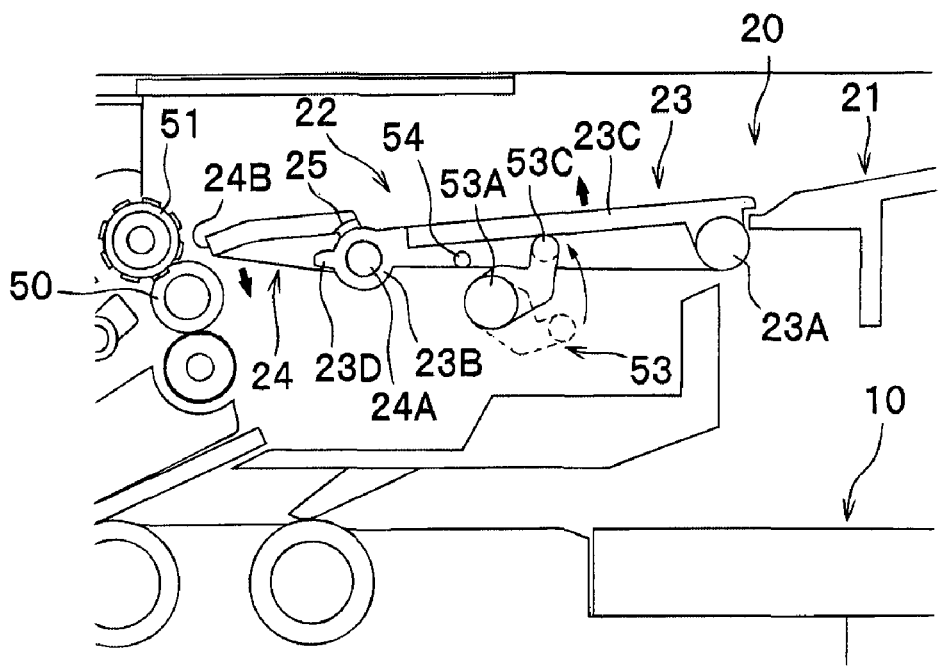
FIG. 9 is a partial cross-sectional view for explaining the operation of the cams and the document output tray.

As shown in FIG. 8, the shaft part 53A of each cam 53 is driven and rotated counterclockwise in FIG. 8 by the driving force transmitted from the unshown motor, by which the push-up part 53C of each cam 53 pivots upward around the shaft part 53A and then makes contact with the lower surface of the contacting part 23C of the first flap 23. As the push-up part 53C further pivots upward, the contacting part 23C is pushed up as shown in FIG. 9, by which the flap part 22 (first flap 23) is pivoted upward around the pivot shaft 23A. According to the upward pivoting of the push-up part 53C, the flap part 22 (first flap 23) keeps pivoting upward until the push-up part 53C reaches its highest position (corresponding to the top dead center of the cam 53) as shown in FIG. 10.

Meanwhile, in response to the upward pivoting of the first flap 23, the upstream end 24B of the second flap 24 pivots downward around the pivot shaft 24A as shown in FIG. 9 due to its own weight. Due to the downward pivoting of the second flap 24 (upstream end 24B), the apex of the bent part 25 relatively projects upward and thereby forms a projecting part 25A (as the uppermost part of the second flap 24) as shown in FIG. 10. The downward pivoting of the second flap 24 (upstream end 24B) is restricted when the lower surface of the second flap 24 makes contact with the stopper 23D.

Figure 10:
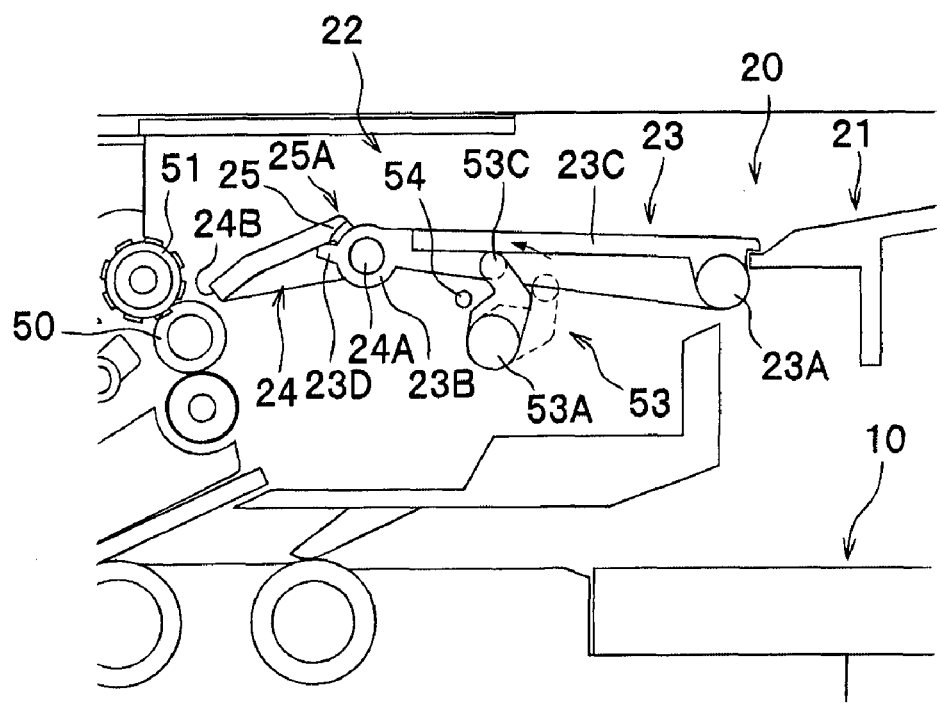
FIG. 10 is a partial cross-sectional view for explaining the operation of the cams and the document output tray.
Figure 11:
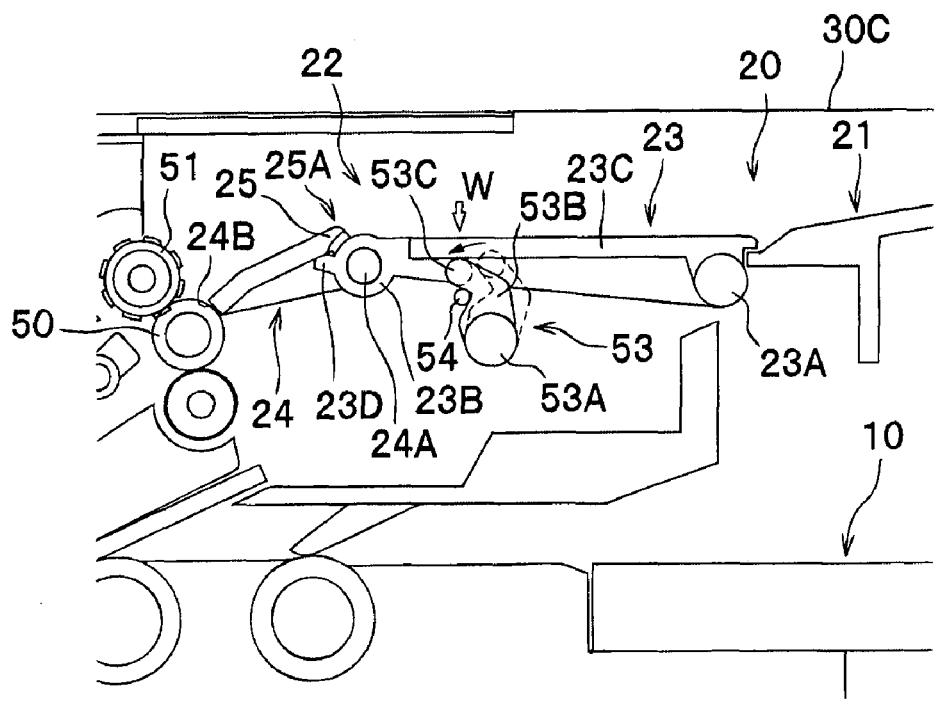
FIG. 11 is a partial cross-sectional view for explaining the operation of the cams and the document output tray.
Figure 12A:
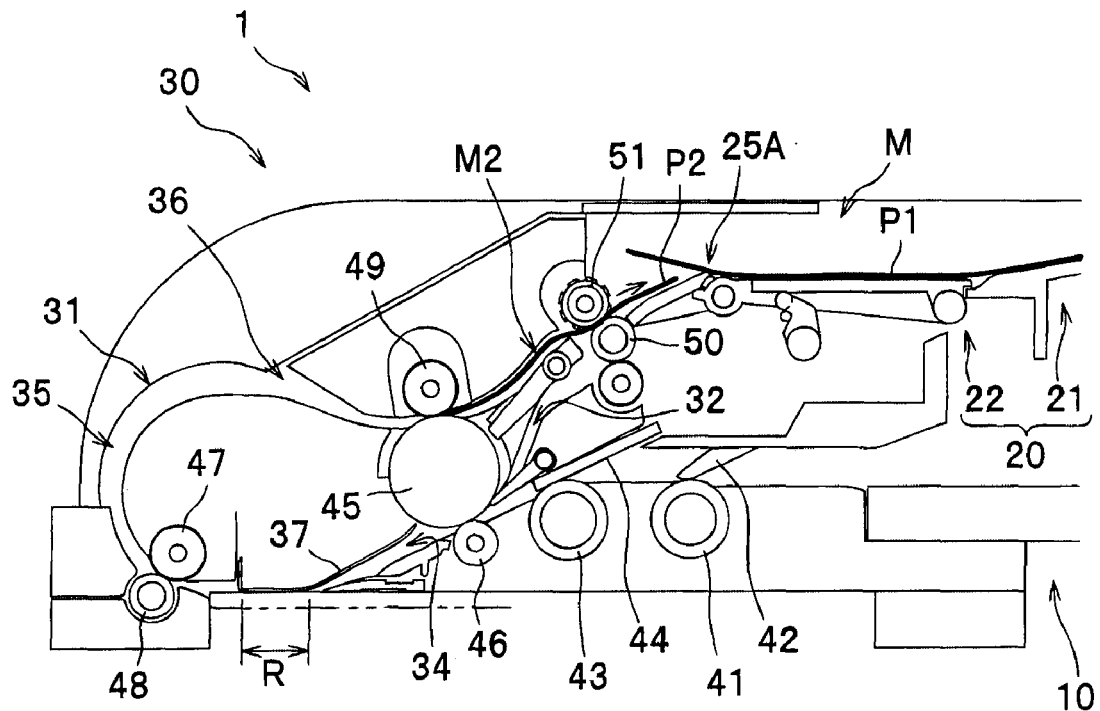
FIG. 12A is a cross-sectional view showing a state of the document feeding device in a second ejection mode.
Figure 12B:
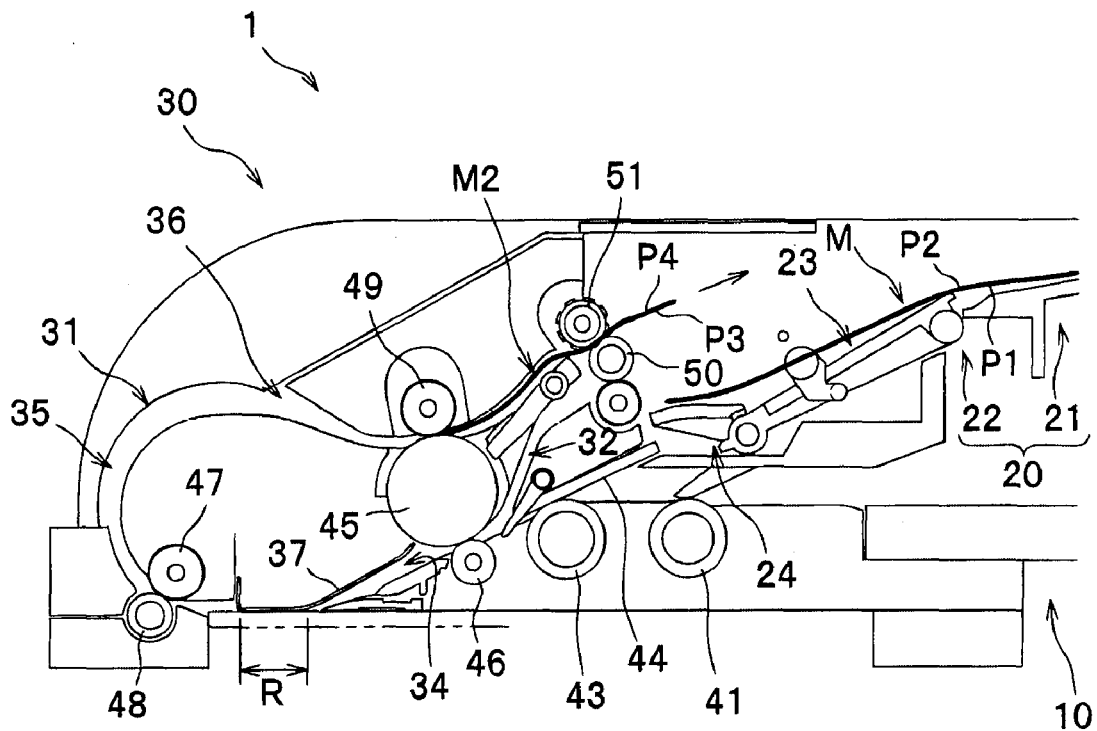
FIG. 12B is a cross-sectional view showing a state of the document feeding device in a first ejection mode.

As shown in FIG. 11, each cam 53 (push-up part 53C) continues rotating counterclockwise in FIG. 11 across the top dead center (the position shown in FIG. 10). The counterclockwise rotation of each cam 53 is restricted when its link part 53B makes contact with each supporting member 54 protruding inward in the width direction from each side panel 30C (only one of the two side panels 30C is shown in FIG. 11), by which the cams 53 are stopped. By restricting the rotation of the cams 53 and supporting the cams 53 at the position across the top dead center by use of such supporting members 54, the documents ejected to the document output tray 20 (flap part 22) can be supported stably even when numbers of documents are ejected and the weight W of the documents on the document output tray 20 (flap part 22) increases. The flap part 22 is kept at the position by the supporting members 54 without the need of constantly driving the cams 53, by which power consumption can be saved.

In this case where the flap part 22 has pivoted upward, the upstream end of documents M already ejected to the document output tray 20 stays lifted by the projecting part 25A from the document output tray 20 (second flap 24) as shown in FIG. 12A. Thus, when the next document M2 is fed by the switchback roller 50 and the pinch roller 51, the downstream end of the document M2 makes contact with an upstream end part of the lower surface of the documents M. Thereafter, the document M2 is ejected while directly sliding under the documents M.

In the case of single-side scan (see FIG. 3), documents M already scanned have been ejected to the document output tray 20 with their scan target surfaces P1 facing upward as explained above. Therefore, by ejecting the next document M2 (with its scan target surface P2 facing upward) while sliding it under the already ejected documents M, the documents M and M2 can be arranged in the normal order (with their scan target surfaces P1 and P2 facing upward).

In order to pivot the flap part 22 downward, the shaft part 53A of each cam 53 is driven and rotated clockwise in FIG. 11 by the driving force transmitted from the unshown motor, by which the push-up part 53C (which has supported the contacting part 23C of the first flap 23) pivots downward around the shaft part 53A, by which the flap part 22 (first flap 23) pivots downward around the pivot shaft 23A due to its own weight. Meanwhile, in response to the downward pivoting of the first flap 23, the upstream end 24B of the second flap 24 pivots upward (relative to the first flap 23) around the pivot shaft 24A, by which the apex of the bent part 25 sinks relatively as shown in FIG. 8 (in which the apex is substantially at the same level as the upper surface of the second flap 24 on the upstream side of the apex).

In this case where the flap part 22 has pivoted downward, a document M ejected is placed on the document output tray 20 (the second flap 24, the first flap 23 and the tray part 21) as shown in FIG. 12B. In this state, the upstream end of the document M is situated below the nipping position of the switchback roller 50 and the pinch roller 51. Thus, the next document M2 fed by the switchback roller 50 and the pinch roller 51 is ejected while being stacked (placed) on the document M.

In the case of double-side scan (see FIG. 6), documents M already scanned have been ejected to the document output tray 20 with their front scan target surfaces P1 facing downward and their back scan target surfaces P2 facing upward as explained above. Therefore, by ejecting the next document M2 (with its front scan target surface P3 facing downward and its back scan target surface P4 facing upward) while stacking it on the already ejected documents M, the documents M and M2 can be arranged in the normal order (with the scan target surfaces P1, P2, P3 and P4 arranged normally from below).

Incidentally, when the flap part 22 pivots downward, the projecting part 25A shown in FIG. 12A sinks relatively, by which the apex of the bent part 25 (which has formed the projecting part 25A) comes to substantially the same level as the upper surface of the second flap 24 on the upstream side of the apex. Thus, even when the first document M is ejected with its downstream end bending downward, the document M is smoothly fed to the first flap 23 and the tray part 21 and placed on the document output tray 20 without being caught by the apex of the bent part 25. Consequently, a document M2 ejected next can also be stacked (placed) successfully on the first document M.

With the document feeding device 1 configured as above, the document ejection mode can be switched between the first ejection mode (for ejecting each document M2 while stacking it on the already ejected documents M) and the second ejection mode (for ejecting each document M2 while sliding it under the already ejected documents M) by use of the cams 53 and the document output tray 20.

By the switching of the document ejection mode, the documents can be ejected to a common document output tray 20 in the normal arrangement order (specifically, with the scan target surfaces of the documents arranged in the normal order) irrespective of whether the scanning mode is single-side scan or double-side scan, without the need of executing the aforementioned idle feeding. Consequently, the time for the idle feeding of each document becomes unnecessary and the total time necessary for completing the scanning of the documents can be reduced considerably. Further, since the documents can be ejected to one (common) document output tray 20 in the normal arrangement order (irrespective of whether the scanning mode is single-side scan or double-side scan), a great degree of user convenience can be realized.

Since the document ejection mode is switched by pivoting (moving) the flap part 22 up and down with the cams 53, the switching of the document ejection mode can be conducted automatically by the movement of the cams 53, by which the user convenience can be enhanced compared to cases where the document ejection mode is switched manually.

In the document output tray 20, only the flap part 22 is pivoted up and down. Thus, the load on the motor for driving the cams 53 can be lessened compared to cases where the whole document output tray is pivoted up and down. Further, the switchback roller 50 can be kept at a fixed position, by which the overall configuration of the ejection mechanism can be simplified compared to cases where the switchback roller 50 is moved.

The flap part 22 is pivoted upward by pushing up its lower surface (i.e. the contacting parts 23C of the first flap 23) with the cams 53. Thus, the height of the flap part 22 can be changed and adjusted by changing the height of the cams 53 (i.e. the height of the push-up parts 53C).

Incidentally, the document M at the scanning position R is fed from the center to the downstream end of the platen glass G (from right to left in FIG. 3) as shown in FIG. 3, etc. in the document feeding device 1 of this embodiment. Thus, the platen glass G (scanning glass) of the document feeding device can be formed by a sheet of glass (transparent material). Suppose that the document M is fed in the opposite direction (from the left end toward the center of the platen glass G) in the configuration of FIG. 3, the document M shoots into a gap between the upper surface of the platen glass G and the lower surface of the document feeding device 1 and the feeding of the document M to the document output tray situated to the upper right (the document input tray 10 in this embodiment) becomes impossible. Thus, in cases where the document M is fed in the opposite direction (opposite to the feeding direction in FIG. 3), the platen glass G has to be separated into two at a position to the right of the scanning position R and a sloped surface (with its lower end situated slightly below the upper surface of the platen glass G and its upper end situated to the upper right) has to be provided between the two sheets of platen glass G so that the document M can be fed to the document output tray situated to the upper right without letting the document M shoot into the gap between the upper surface of the platen glass G and the lower surface of the document feeding device 1. While the platen glass G has to be separated into two in cases where the document M is fed in such a direction (opposite to that in FIG. 3), the document M is fed in the feeding direction shown in FIG. 3 in the document feeding device 1 of this embodiment, by which the platen glass G can be formed by a sheet of glass (transparent material) and the document scanner can be downsized. Consequently, miniaturization of the device (scanner, MFP, copier, etc.) in which the document feeding device 1 is installed can be realized.

While a description has been given above of a preferred embodiment in accordance with the aspects of the present invention, the present invention is not to be restricted by the particular illustrative embodiment and a variety of modifications, design changes, etc. are possible without departing from the scope and spirit of the present invention described in the appended claims.

Figure 13:
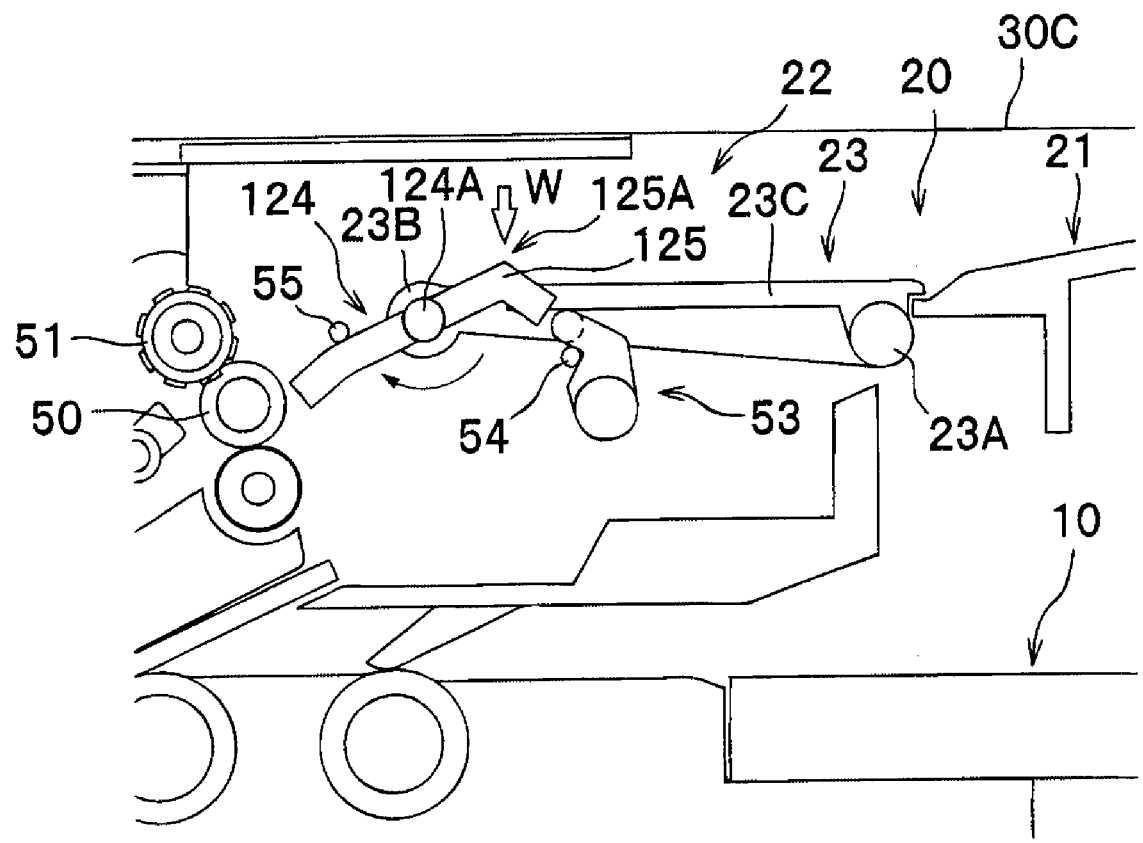
FIG. 13 is a partial cross-sectional view showing a modification of the configuration of the document feeding device.

For example, while the second flap 24 in the above embodiment has the pivot shaft 24A at its downstream end and the bent part 25 on the upstream side of the pivot shaft 24A as shown in FIG. 2, the second flap 24 may be configured differently. FIG. 13 is a partial cross-sectional view showing a modification of the configuration of the document feeding device 1. In the modification, a pivot shaft 124A to be borne by the shaft bearing part 23B of the first flap 23 is formed approximately in the middle of a second flap 124, and a bent part 125 of the second flap 124 is formed on the downstream side of the pivot shaft 124A.

In the modification shown in FIG. 13, each side panel 30C is provided with a second flap supporting member 55 in a substantially cylindrical shape protruding inward in the width direction. As the number of documents on the document output tray 20 increases and their weight W applied to a projecting part 125A of the second flap 124 becomes heavier, the second flap 124 tends to rotate clockwise in FIG. 13 around the pivot shaft 124A. However, the upper surface of the second flap 124 makes contact with the second flap supporting members 55 and the rotation is prohibited, by which the second flap 124 is allowed to stably support the documents.

Figure 14A:
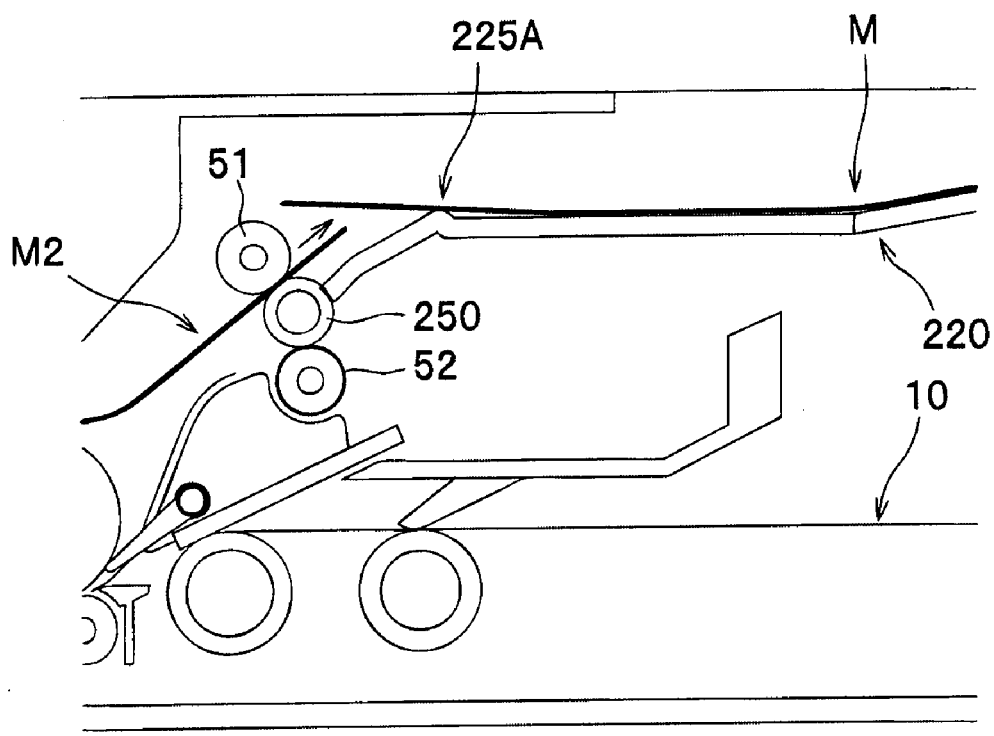
FIGS. 14A and 14B are partial cross-sectional views showing a modification of a switching drive mechanism of the document feeding device.
Figure 14B:
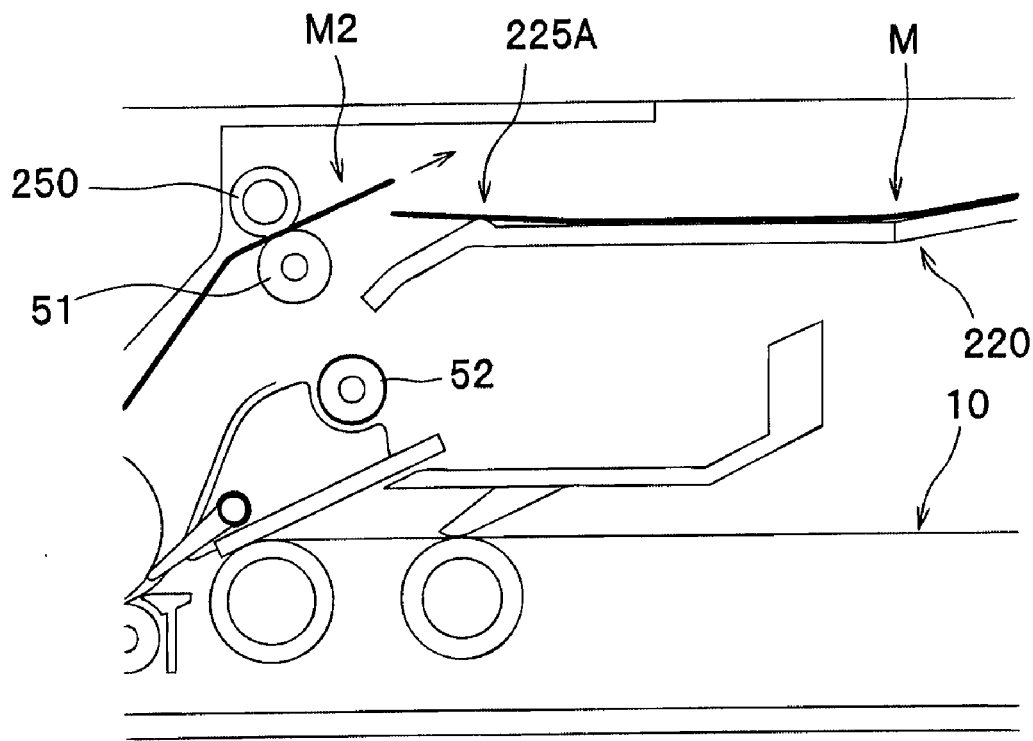

While the cams 53 are employed as an example of the switching drive mechanism in the above embodiment, the switching drive mechanism employed in the embodiment is not restricted to cams, as long as the mechanism is capable of relatively moving the projecting part (lifting the upstream end of the ejected documents from the document output tray) and the nipping position of a pair of ejection rollers (for ejecting each document) in the vertical direction. FIGS. 14A and 14B are partial cross-sectional views showing a modification of the switching drive mechanism. In the modification, the switching drive mechanism is capable of moving a switchback roller 250 between the position shown in FIG. 14A (for contacting the pinch roller 51 from below) and the position shown in FIG. 14B (for contacting the pinch roller 51 from above).

As shown in FIGS. 14A and 14B, the upstream end of the documents M already ejected to a document output tray 220 is lifted from the document output tray 220 by a projecting part 225A. At the position of FIG. 14A (where the switchback roller 250 contacts the pinch roller 51 from below), the nipping position of the switchback roller 250 and the pinch roller 51 is situated below the projecting part 225A. Thus, when the next document M2 is fed by the rollers 250 and 51, the downstream end of the document M2 makes contact with an upstream end part of the lower surface of the documents M, and thereafter the document M2 is ejected while directly sliding under the documents M. On the other hand, at the position of FIG. 14B (where the switchback roller 250 contacts the pinch roller 51 from above), the nipping position of the switchback roller 250 and the pinch roller 51 is substantially at the same level as the projecting part 225A. Thus, the next document M2 (fed obliquely upward by the rollers 250 and 51) passes above the upstream end of the documents M and is ejected while being stacked on the documents M.

While the document output tray 20 is placed above the document input tray 10 in the document feeding device 1 of the above embodiment, the positional relationship of the trays 10 and 20 is not particularly restricted; the aspects of the present invention are applicable also to configurations in which the document output tray is placed below the document input tray.

The configuration of the feeding mechanism and the turnover mechanism described in the above embodiment is just an example, and thus the configuration (e.g. the number, arrangement, etc. of the rollers) can be changed properly as needed. It is also possible to employ a pinch roller instead of each pad. In short, the configuration, employed members, etc. of the feeding mechanism and the turnover mechanism may be changed properly without departing from the scope and spirit of the present invention.

The configuration of the feeding path 31 and the turnover path 32 described in the above embodiment is just an example, and thus the configuration is not to be restricted to that in the above embodiment. In other words, the configuration of the feeding path 31 and the turnover path 32 (or the configuration of the feeding mechanism and the turnover mechanism) may be changed properly depending on the positional relationship between the document input tray and the document output tray, the shape, size, etc. of the document feeding unit, etc.

What is claimed is:

1. A document feeding device for feeding documents, comprising:
    a document input tray on which documents to be fed are configured to be placed;
    a document output tray to which the documents are configured to be ejected;
    a feeding mechanism which is provided for a feeding path connecting the document input tray and the document output tray via a scanning position and feeds each document from the document input tray to the scanning position and from the scanning position to the document output tray;
    a turnover mechanism which is provided for a turnover path connected to the feeding path and returns the document after passing through the scanning position to a position on an upstream side of the scanning position while interchanging a front end and a rear end of the document in a feeding direction; and
    an ejection mechanism which is configured so that its document ejection mode can be switched between a first ejection mode for successively ejecting each document while stacking each document on documents already ejected to the document output tray and a second ejection mode for successively ejecting each document while sliding each document under the documents already ejected to the document output tray,
    wherein the document output tray includes a tray part and a flap part which is attached to the tray part to be pivotable, situated on an upstream side of the tray part in the feeding direction, and equipped with a projecting part,
    wherein a switching drive mechanism pivots the flap part in a vertical direction,
    wherein the flap part includes a first flap which is attached to the tray part to be pivotable on the upstream side of the tray part in the feeding direction and a second flap which is attached to the first flap to be pivotable on the upstream side of the first flap in the feeding direction and is equipped with a bent part,
    wherein, when the flap part pivots upward in the second ejection mode, the bent part of the second flap forms the projecting part, and
    wherein, when the flap part pivots downward in the first ejection mode, the bent part relatively sinks with respect to the second flap compared to its relative position in the second ejection mode due to pivoting of the second flap with respect to the first flap.

2. The document feeding device according to claim 1, wherein:
    the document output tray is equipped with the projecting part which lifts an upstream end of the already ejected documents regarding the feeding direction from the document output tray in the second ejection mode, and
    the ejection mechanism includes a pair of ejection rollers which ejects the document to the document output tray and the switching drive mechanism which relatively moves the projecting part and a nipping position of the pair of ejection rollers in a vertical direction.

3. The document feeding device according to claim 1, wherein the switching drive mechanism includes a cam which pivots the flap part upward by pushing up a lower surface of the flap part.

4. The document feeding device according to claim 3, further comprising a supporting member which supports the cam when the cam has pivoted the flap part upward, wherein:
    the cam supports the flap part at a position across a top dead center of the cam, and
    the supporting member is placed so as to support the cam by restricting further rotation of the cam from the position across the top dead center.

5. The document feeding device according to claim 1 wherein:
    the second flap is supported on the first flap via a pivot shaft, and
    the bent part of the second flap is situated on the downstream side of the pivot shaft in the feeding direction, and
    upward pivoting of the second flap is restricted by a second flap supporting member which is provided on an upstream side of the pivot shaft in the feeding direction.

\* \* \* \* \*